No. 660,676.  
G. C. P. ANDERSSON.  
ROTARY ENGINE.  
(Application filed Jan. 9, 1900.)  
Patented Oct. 30, 1900.

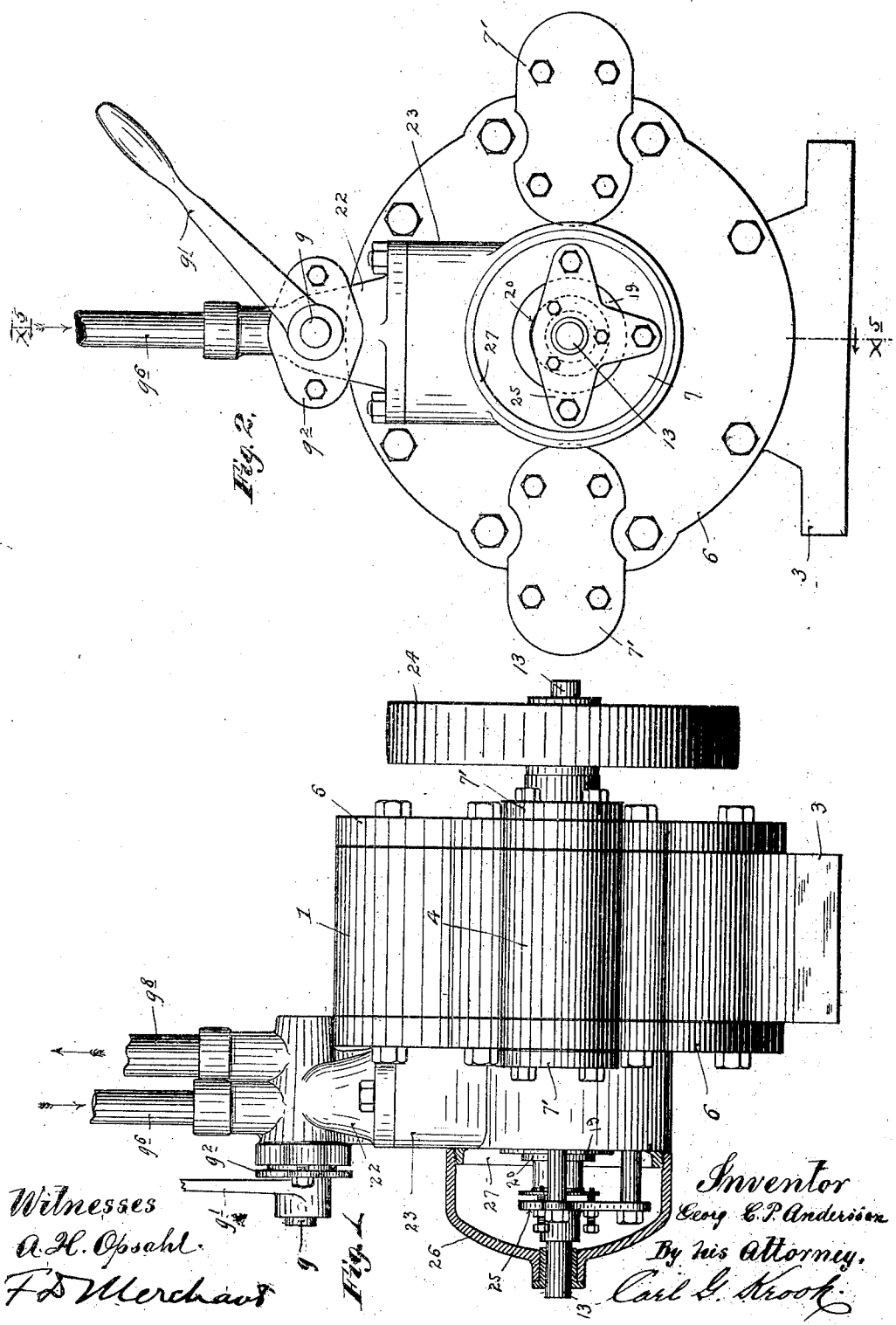

(No Model.)

5 Sheets—Sheet 2.

Witnesses.
A. H. Opsahl.
F. D. Merchant

Inventor.
Georg C. P. Andersson
By his Attorney.
Carl G. Krook

No. 660,676.  
G. C. P. ANDERSSON.  
ROTARY ENGINE.  
(Application filed Jan. 9, 1900.)  
(No Model.)  
Patented Oct. 30, 1900.  
5 Sheets—Sheet 3.
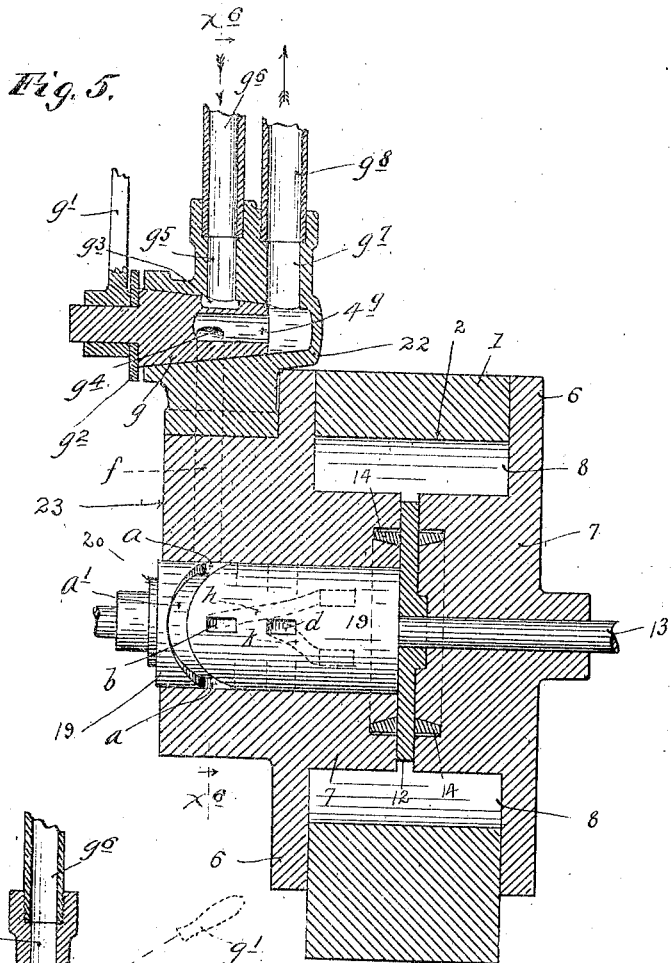
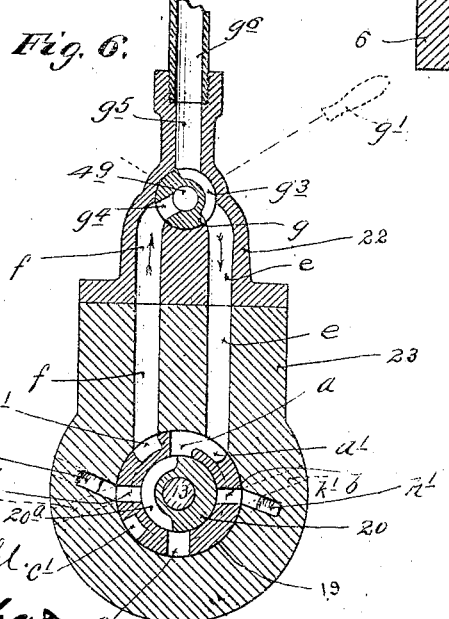

No. 660,676. Patented Oct. 30, 1900.
G. C. P. ANDERSSON.
ROTARY ENGINE.
(Application filed Jan. 9, 1900.)
(No Model.) 5 Sheets—Sheet 4.
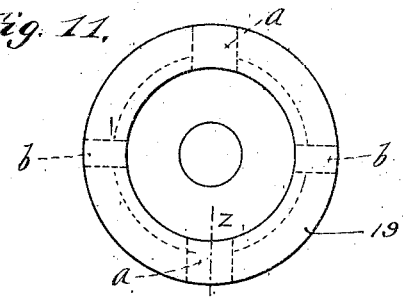
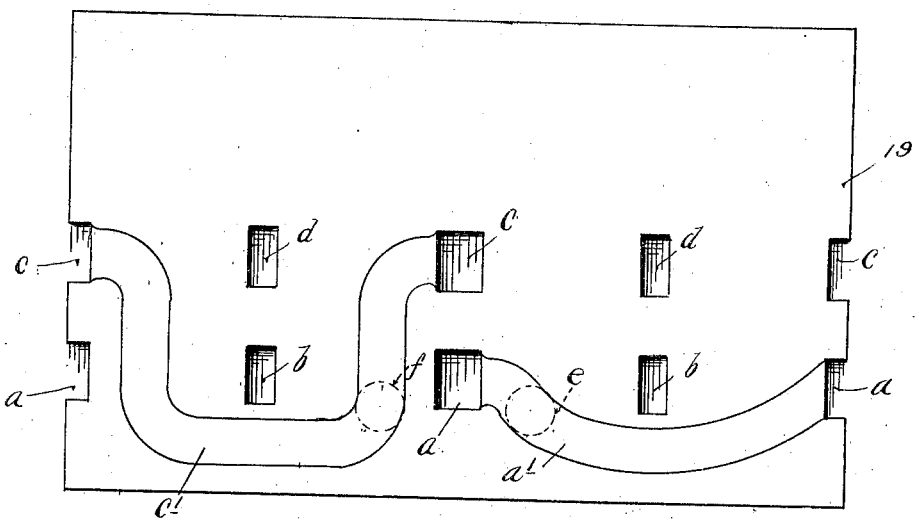
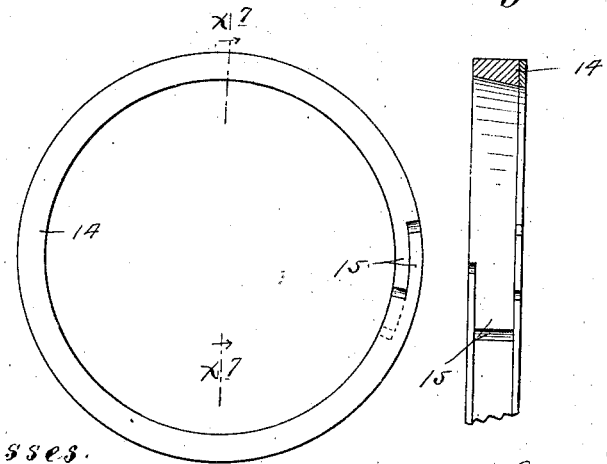
Witnesses.
A. H. Opsahl.
F. D. Merchant.
Inventor
Georg C. P. Andersson
By his Attorney.
Carl G. Krook.

No. 660,676. Patented Oct. 30, 1900.
G. C. P. ANDERSSON.
ROTARY ENGINE.
(Application filed Jan. 9, 1900.)
(No Model.) 5 Sheets—Sheet 5.
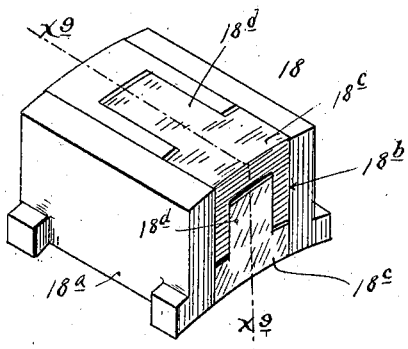
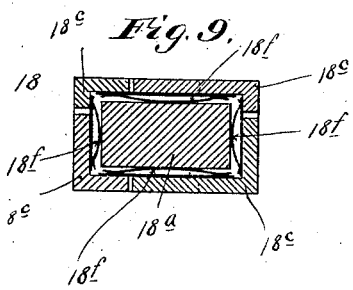
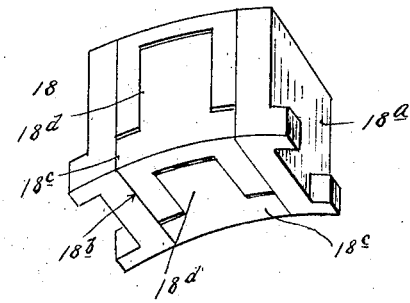
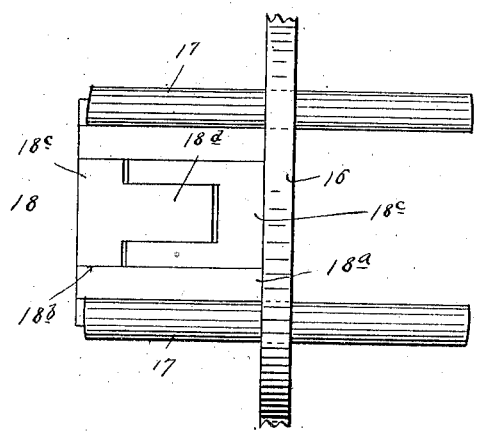
Witnesses.
A. H. Opsahl.
F. D. Merchant.
Inventor
Georg C. P. Andersson
By his Attorney
Carl G. Krook

UNITED STATES PATENT OFFICE.

GEORG C. P. ANDERSSON, OF ST. PAUL, MINNESOTA.

ROTARY ENGINE.

SPECIFICATION forming part of Letters Patent No. 660,676, dated October 30, 1900.

Application filed January 9, 1900. Serial No. 845. (No model.)

*To all whom it may concern:*

Be it known that I, GEORG C. P. ANDERSSON, a citizen of the United States, residing at St. Paul, in the county of Ramsey and State of Minnesota, have invented certain new and useful Improvements in Rotary Engines; and I do hereby declare the following to be a full, clear, and exact description of the invention, such as will enable others skilled in the art to which it appertains to make and use the same.

My invention relates to a rotary engine, and has for its objects to improve the same with a view of obtaining the maximum efficiency with simple and durable mechanism which is not liable to get out of order and also to provide an engine which may be readily reversed and easily controlled.

To the above ends my invention consists of the novel devices and combination of devices hereinafter described, and defined in the claims.

The invention is illustrated in the accompanying drawings, wherein like characters indicate like parts throughout the several views.

Figure 3:
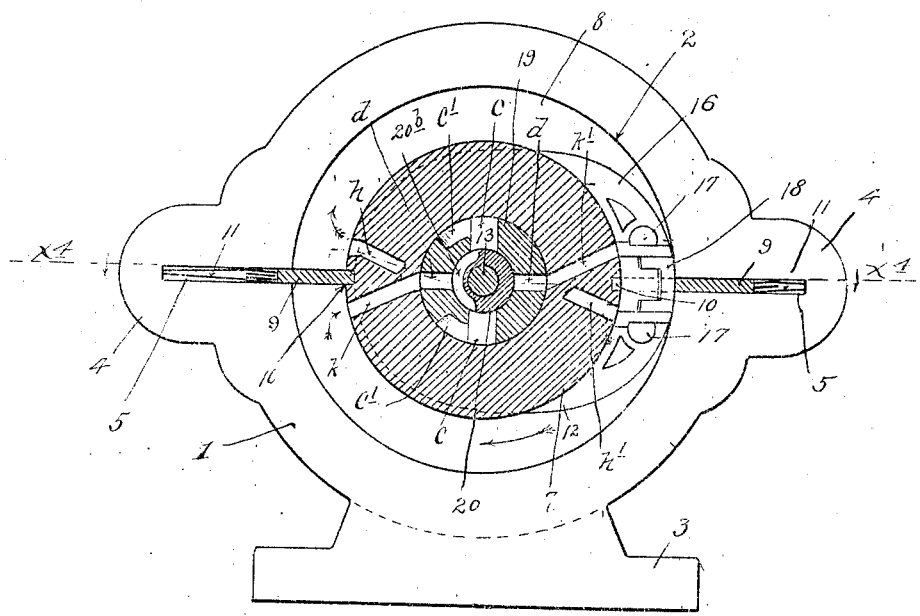
Figure 4:
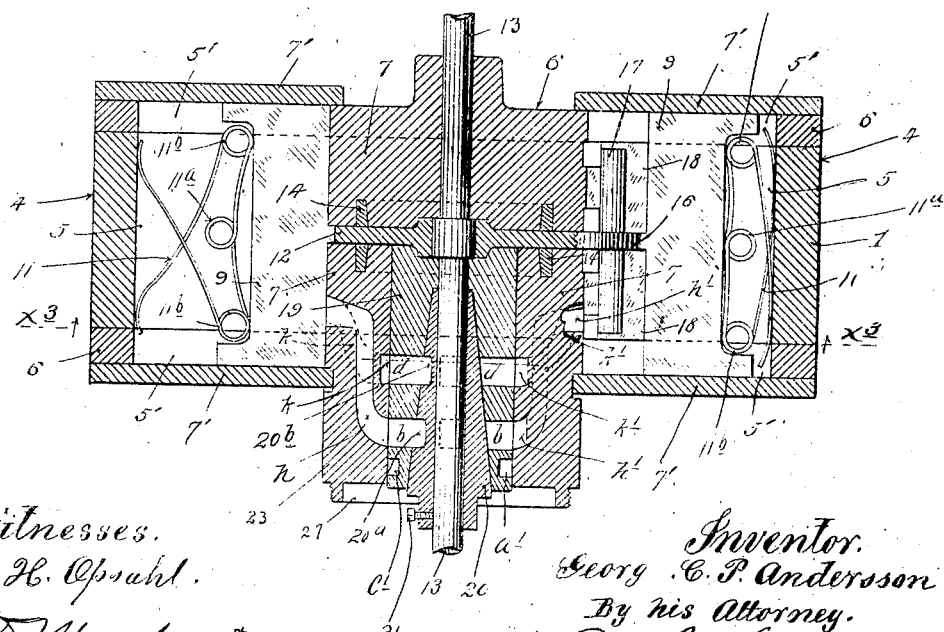

Figure 1 shows the complete engine in side elevation with some parts sectioned and others broken away. Fig. 2 is a front elevation of the engine with some parts removed. Fig. 3 is a transverse vertical section taken on the line $x^3 x^3$ of Fig. 4. Fig. 4 is a horizontal section taken on the line $x^4 x^4$ of Fig. 3. Fig. 5 is a longitudinal section taken on the line $x^5 x^5$ of Fig. 2, some parts being shown in full and others broken away. Fig. 6 is a transverse vertical section taken on the line $x^6 x^6$ of Fig. 5. Fig. 7 is a detail view showing one of the packing-rings in side elevation. Fig. 7ª is a transverse section on the line $x^7 x^7$ of Fig. 7. Figs. 8 and 8ª are perspective views of one of the propelling-blocks. Fig. 9 is a section on the line $x^9 x^9$ of Fig. 8. Fig. 10 is a plan view showing a portion of the piston-disk and one of the propelling-blocks. Fig. 11 is an end elevation of a bushing or valve-seat. Fig. 12 is a view in diagram showing the surface of the bushing as of cut on the line $z z$ of Fig. 11 and spread out flat.

The main body-casting 1 is somewhat in the form of a cylinder, being provided with a cylindrical bore 2, and is therefore generically termed the "cylinder" or "cylindrical" member of the engine. It is, however, provided with a suitable base 3 and with lateral bulges 4, in which horizontal slots or abutment-seats 5 are cut, as best shown in Figs. 3 and 4.

The cylinder-heads 6 are secured by bolts, screws, or otherwise to the cylinder 1, and they are provided with inwardly-projecting cylindrical hub portions 7, that are concentric with the cylindrical bore 2, and terminate at their inner ends a short distance apart, for a purpose presently to be noted. The abutment-seats 5 are extended through the cylinder-head 6, as shown at 5', and the ends of said seats are closed by removable plates 7', that are secured to the said cylinder-heads by means of screws or other suitable devices. (See Figs. 1 and 2.)

By the arrangement above described an annular runway or channel 8 is formed between the cylindrical bore 2 and the concentric hubs 7. In this channel or runway 8 the propelling blocks or portions of the rotary piston are mounted to run, as will be presently noted.

The abutment-seats 5 in the cylinder 1 extend in the same horizontal plane and stand diametrically opposite to each other, and in each of these seats is a radially-movable abutment 9, as shown, in the form of a flat blade-like section which, when moved inward to its extreme position, closely engages the hubs 7 and preferably fits into a shallow groove 10, formed on the said hubs. These abutments or blades 9 are under strain to move inward from springs 11, compressed between the backs of the same and the outer extremities of the seats 5.

The piston member of the engine, which is in the form of a disk 12, is rigidly secured on a shaft 13 and is provided with suitable propelling blocks or projections, to be presently noted. The piston-disk 12 works and closely fits between the inner extremities of the hubs 7 of the cylinder-heads 6, and steam-tight joints are formed between the same and the said hubs by packing-rings 14, seated in the said hubs and engaging the opposite faces of the said disk. These packing-rings 14 have tapered inner surfaces which engage correspondingly-tapered portions of the hubs 7, and said rings are each split at one point and provided with telescoping ends 15. (Best shown in Figs. 7 and 7ª.) These rings are made of metal having more or less spring, which contracts them onto the coöperating tapered portions of the hubs 7, and thus produces a camming action which keeps them forced into engagement with the adjacent faces of the piston-disk 12. This feature is novel. At one side the so-called "piston-disk" 12 is extended outward of the hub 7 and at its outermost point has tangential contact with the bore 2 of the cylinder to form an abutment-retracting cam 16. The so-called "propelling" blocks or projections are secured or applied to this projecting cam portion 16, this, as shown, being preferably accomplished by providing the said cam 16 with oppositely-projecting pairs of studs or pins 17, between which the propelling blocks or projections are removably but securely held. The so-called "propelling-blocks" 18 project in opposite directions from the cam portion 16 of the piston-disk, and they snugly fit in the annular runways or channels 8, formed on the opposite sides of said piston-disk, between the hubs 7 and the cylinder-bore 2. The said blocks 18 are preferably, as shown, made in sections and are automatically expansible, so as to keep tight engagement with the surfaces of the cylinder over which they run.

One of the hubs 7 is provided with a bushing 19, which has a plurality of ports and is formed with these ports before it is placed within the hub, this being done as a matter of convenience; but after the said bushing is placed in working position it may for the purposes of this case be treated as an integral and fixed part of said hub. The bushing 19 is provided with a valve-seat or central bore, which, as shown, is tapered and receives and closely fits a tapered valve 20, that is formed with a pair of segmental ports 20ª and 20ᵇ, both of which extend approximately one hundred and eighty degrees, as best shown in Figs. 3, 4, and 6. It should be here noted and remembered that this valve 20 is fixed on the piston-shaft 13 and rotates therewith and with the piston-disk 12. As shown, the said valve 20 is rigidly but adjustably and removably secured to the shaft 13 by means of a set-screw 21. The segmental ports 20ª and 20ᵇ of the rotary valve 20 move in line with ports $a$ $b$ and $c$ $d$, respectively, which ports open radially through the bushing 19. The ports $a$ are two in number and are located diametrically opposite each other, and are connected by a channel or groove $a'$. Also the ports $c$ are two in number and are located diametrically opposite from each other, being connected by a groove or channel $c'$, formed in the periphery of the bushing 19. Also there are two of the ports $d$ and two of the ports $b$, located, respectively, diametrically opposite to each other. Each port $a$ is located in axial line with one of the ports $c$, and each port $b$ is likewise located in axial line with one of the ports $d$. The arrangement of these ports is well illustrated in the diagram view Fig. 12. A pair of steam-passages $e$ and $f$ open, respectively, into the channels $a'$ and $c'$ of the bushing 19, both of these ports being terminated in a valve-seat $f'$, formed in a supplemental casting 22, that is suitably secured on a bulged portion 23 of the forward cylinder-head 6. A reversing throttle-valve $g$ is mounted for rotary movement within the valve-seat $f'$ and is provided with a hand piece or lever $g'$ by means of which it may be moved. The valve is held in working position by means of a retaining-plate $g^2$ or other suitable device, and it is formed with an admission-port $g^3$ and an exhaust-port $g^4$, the latter of which ports opens into a hollow or central cavity $4^e$ of the said valve. The admission-port $g^3$ of the throttle-valve $g$ is in constant communication with the inlet-passage $g^5$, which leads from the steam-supply pipe $g^6$. The axial passage $g^4$ of the throttle-valve is in constant communication with an exhaust-passage $g^7$, which leads to the exhaust-pipe $g^8$. This construction is best shown in Figs. 5 and 6. The points at which the steam-passages $e$ and $f$ open, respectively, into the channels $a'$ and $c'$ are indicated in the diagram view, Fig. 12, by the dotted-line circles.

The diametrically-opposite ports $b$ of the valve-seat bushing 19 are in communication with the interior of the cylinder or with the channel 3, through ports $h$ and $h'$, formed in the hub 7 of the forward cylinder-head, as best shown in Figs. 3 and 4. The port $h$, it will be noted, opens into the channel 8 above, and the port $h'$ opens into said channel below the horizontal plane in which the abutments 9 are mounted to work, this being done for a purpose which will hereinafter appear. In a very similar manner the diametrically-opposite ports $d$ are in communication with the cylinder-channel 8, through a pair of ports $k$ and $k'$, the former of which opens into said channel at a point below and the latter at a point above the horizontal plane of the abutments 9.

The piston-shaft 13 is provided on one end with a fly-wheel 24, and at its other end—to wit, its forward end—it is mounted to run in a bearing 25. 26 is a cap or housing, which, as shown, is screwed onto a flange 27 of the forward cylinder-head 6.

The springs 11 heretofore noted as operating upon the sliding abutments 9 are of peculiar form, each being formed with a central coil 11ª and with end coils 11ᵇ. The center coil 11ª gives the spring greatly-increased resilience. When the springs are applied, as shown in Fig. 4, the force thereof will be thrown equally at both ends of the abutments, so that the abutments will be yieldingly held for movements always parallel to their original position.

Returning to the consideration of the specific construction of the so-called "propelling-blocks" heretofore noted and indicated as entireties by the numeral 18, attention is particularly called to Figs. 8 to 10, inclusive. Each block 18 is made up of a body-section $18^a$, which fits between the projecting pin 17 of the piston-disk 12 and is provided with a groove $18^b$, running entirely around its four sides transversely of the annular channel or runway 8. In the groove $18^b$ packing-strips $18^c$ are placed. These packing-strips are bent at right angles to form the segmental edges of the block, and the projecting ends of the same telescope with the adjacent ends of the coöperating packing-strips, as shown at $18^d$. In this way a continuous rectangular and expansible packing is provided. The sections of this packing are yieldingly pressed outward and held in close engagement with the four walls of the channel or runway 8 by means of light springs $18^f$, compressed between the said sections and the bottom of the rectangular channel $18^b$, as best shown in Fig. 9. As is obvious, this packing is self-adjusting to the walls of the channel and is but very slightly damaged by wear.

The operation of the engine constructed as above described will be substantially as follows: With the throttle-valve $g$ set in the one extreme position (indicated in the drawings and best illustrated in Fig. 6) the piston of the engine will be rotated in the direction indicated by the arrow marked on Fig. 4. That this is so is made evident by tracing the open ports and passages. Directing attention first particularly to Figs. 5 and 6, it will be seen that the live steam from the supply-pipe $g^6$ finds admission to the cylinder first through the passage $g^5$, thence through the port $g^3$ of the throttle-valve into the vertical passage $e$, and from thence into the channel $a'$ and ports $a$ of the valve-seat bushing 19. With the rotary piston in the position indicated in the drawings and best shown in Figs. 3 and 6 the live steam finds admission from both of the ports $a$ into the port $20^a$ of the valve 20, from thence into the left-hand port $b$ of the bushing, and from thence through the port $h$ into the cylinder-channel 8. It will thus be seen that the steam or motive fluid which is at this instant being admitted is admitted into the channel 8 above the left-hand abutment 9, so that its force is exerted to propel the rotary piston 12 and its propelling-blocks 18 in the direction indicated by the arrow on Fig. 3. In the same position of the rotary piston and the valve 20 just indicated the lower section of the cylinder or channel 8, or, in other words, that portion of the channel or runway 8 which is between the operative or left-hand abutment 9 and the exhaust side of the propelling-block 18, is open to exhaust. This exhaust is first through the passage $k$ to the left-hand port $d$ of the bushing 19, from thence through the port $20^b$ of the rotary valve 20 to one or the other or to both of the ports $c$ of the said bushing, and from thence through the channel $c'$ to the vertical passage $f$. From the passage $f$ the steam or exhaust fluid finds a ready escape through the exhaust-port $g^4$ of the throttle-valve $g^3$, thence through the axial passage $4^g$, and from thence through the passage $g^7$ into the ultimate exhaust-pipe $g^8$.

It has been noted that in the particular position of the piston and valve 20 indicated in the drawings the ports $20^a$ and $20^b$ of the valve 20 are respectively open to both of their coöperating ports $b$ and $d$ of the bushing. In all other positions or in nearly all other positions the said ports $20^a$ and $20^b$ will be open to but one of the coöperating pair of ports, and the ports to which they are at any time open will be those which extend to the particular abutment 9 which at that time is operative or extended inward to its extreme position.

It is obvious from the description already given that the cam 16, which is carried by the piston-disk 12, engages the spring-pressed abutments 9 and causes them to recede in the proper order one at a time, so as to clear the propelling-blocks 18 and then as soon as the propelling-blocks have passed the particular abutment permit the same to gradually move inward to assume the operative position. One or the other of the said abutments is thus always rendered effective as a base of reaction for the steam.

To reverse the engine, the lever $g'$ is thrown toward the left into a position at the reverse angle to the coöperating ports and passages from that illustrated in Figs. 2 and 6. By this movement of the throttle-valve $g$ the live steam is admitted into the vertical passage $f$, and will find its admission into the cylinder through the passages above noted and traced as the exhaust-passages for the exhaust-steam, and at the same time the vertical passage $e$ will be opened to exhaust, and the exhaust-steam from the cylinder finds its escape through the passages above noted and traced as the admission-passages for the live steam. When the throttle-valve $g$ is moved until its lever $g'$ is turned straight upward, both the admission and exhaust steam is cut off to and from the engine, and thus it will be seen that the valve $g$ not only serves as a reversing-valve but also as a throttle-valve, by means of which the speed of the engine may be varied.

It will of course be understood that the invention above described is capable of many modifications as to its details of construction. If it be desired to run the engine in one direction only, the valve 20 may be so set on the shaft 13 as to render confined steam expansively effective on the piston. Furthermore, even with a reversible engine the ports may be so arranged as to get the effect of the expansion of steam while cut off from the live steam or source of supply.

What I claim, and desire to secure by Letters Patent of the United States, is as follows:

1. In an engine, a cylinder having fixed and inwardly-projecting hub portions of equal diameter positioned concentric to the bore of said cylinder, to form an annular runway and terminated short of each other, to form a centrally-located piston-seat, in combination with a radially-movable and yieldingly-pressed abutment extended entirely across said runway, a rotary disk-like piston working in the seat between said hub portions, but formed or cut away to leave free communication from one to the other side of said runway, and oppositely-projecting propelling-blocks carried by said piston and filling said runway, said rotary piston having also a cam-surface which directly engages said abutment and causes the same to clear said propelling-block, substantially as described.

2. In a rotary engine, the combination with the cylinder 1 provided with the cylindrical bore 2, and the pair of seats 5, of the heads 6, having the inwardly-projected hubs 7, the rotary piston-disk 12 working between the adjacent ends of the hub 7 and provided with the cam-section 16, the propelling blocks or projections 18 carried by said piston-disk 12 and working in the annular runways formed between said hubs 7 and the cylinder-bore 2, the spring-pressed abutments 9 working in the seats 5 and subject to said cam 16, and valve mechanism controlled by said rotary piston, substantially as described.

3. In a rotary engine, the combination with a cylinder having one or more movable abutments, of a rotary piston within said cylinder having a propelling projection, and a tapered controlling-valve for the admission and exhaust, mounted to rotate with the said piston but free for both rotary and longitudinal adjustments; the former adjustment serving to vary the timed action of said valve and the latter adjustment serving to keep the said valve tightly seated, substantially as described.

4. In a rotary engine, the combination with the cylinder and one or more movable abutments, of a rotary piston in said cylinder having a propelling projection and secured to the shaft 13, the tapered valve 21 having the ports $20^a$ and $20^b$ and adjustably secured on said shaft 13, and the removable bushing 19 having the ports $a$, $a'$, $c$, $c'$, $b$ and $d$, the cylinder-casting having the ports $h$, $h'$ and $k$, $k'$, the said parts operating substantially as described.

In testimony whereof I affix my signature in presence of two witnesses.

GEORG C. P. ANDERSSON.

Witnesses:
CARL G. KROOK,
F. D. MERCHANT.